July 28, 1925.  
F. T. RAMSEY  
VEHICLE  
Filed Sept. 8, 1924  
1,547,265  
2 Sheets-Sheet 1
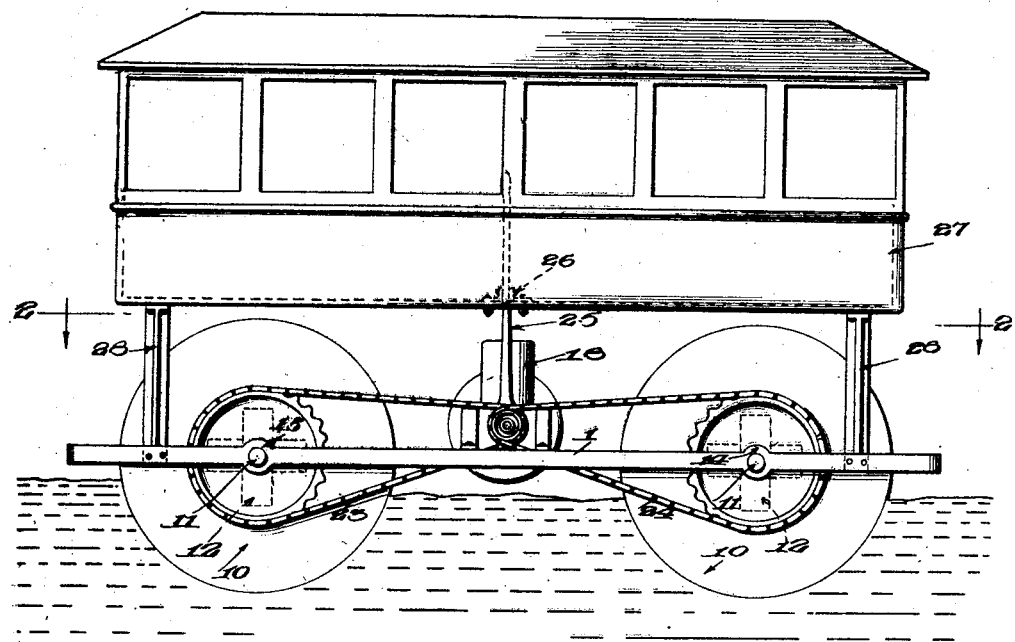
Fig. 1.
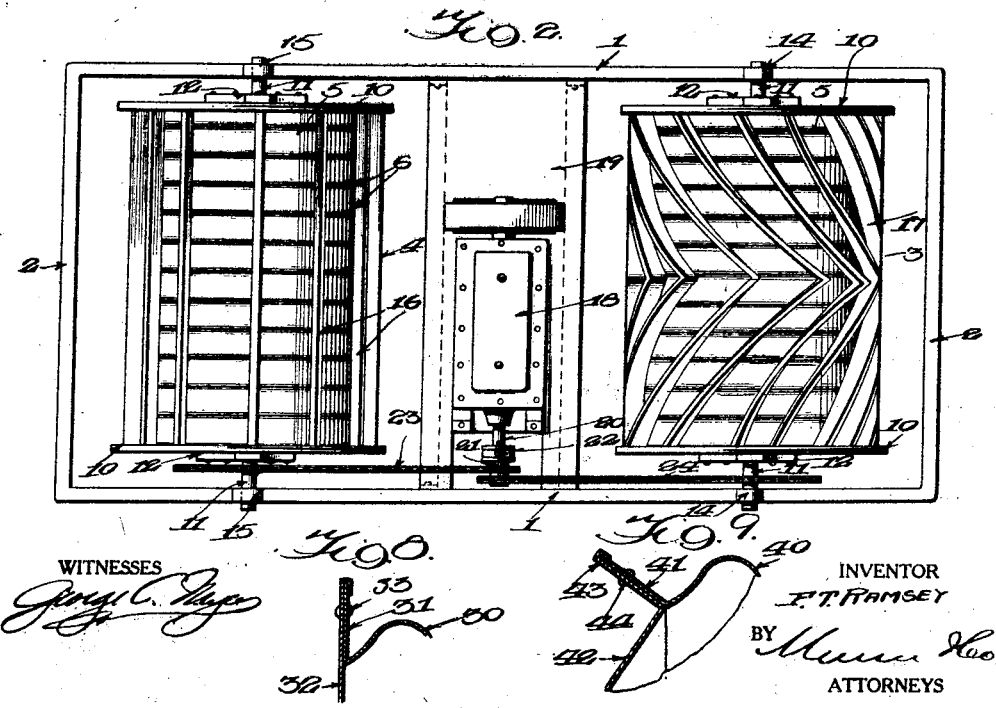
Fig. 2.
Fig. 3.  Fig. 4.
WITNESSES  
INVENTOR  
F. T. RAMSEY  
BY  
ATTORNEYS July 28, 1925.  
F. T. RAMSEY  
VEHICLE  
Filed Sept. 8, 1924  
1,547,265  
2 Sheets-Sheet 2
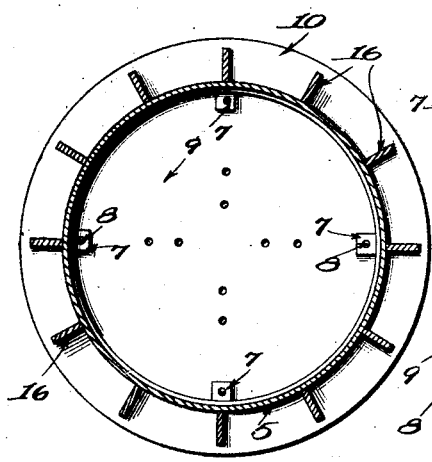
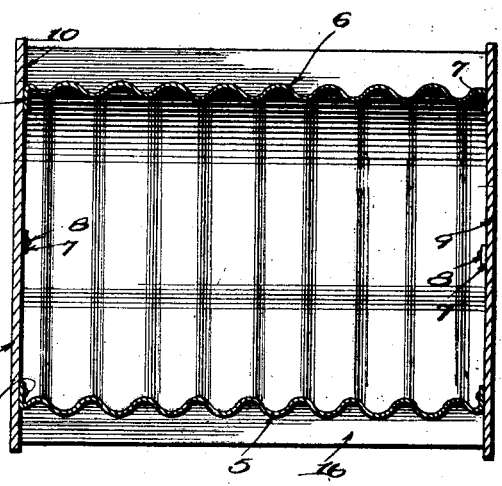
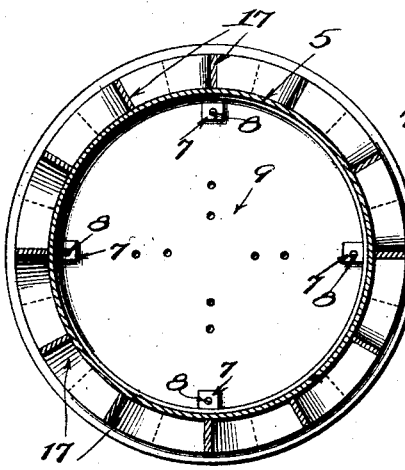
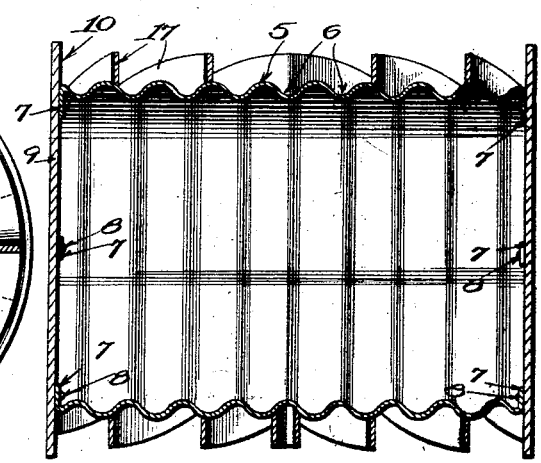
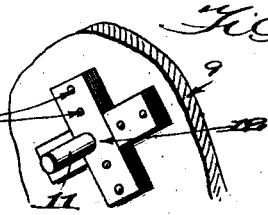
WITNESSES
INVENTOR  
F. T. RAMSEY,  
BY  
ATTORNEYS Patented July 28, 1925.

1,547,265

UNITED STATES PATENT OFFICE.

FRANK TAYLOR RAMSEY, OF AUSTIN, TEXAS.

VEHICLE.

Application filed September 8, 1924. Serial No. 736,568.

*To all whom it may concern:*

Be it known that I, FRANK T. RAMSEY, a citizen of the United States, and resident of Austin, in the county of Travis and State of Texas, have invented certain new and useful Improvements in Vehicles, of which the following is a specification.

The present invention is a vehicle which is adapted particularly for travel through the water and is capable of locomotion on land and it consists in the combinations, constructions and arrangements herein described and claimed.

More specifically, the present invention is an improvement over that which is disclosed in Letters Patent of the United States 1,138,148, granted to me May 4th, 1915.

An object of the present invention is to provide in a vehicle of the character described a novel propelling apparatus comprising a plurality of buoyant propelling members so arranged in respect to one another and so constructed that the operation of any one of the propelling members will not detrimentally affect the operation of any other propelling member.

A further object of the invention is the provision in a vehicle of the character described of an improved rotatable combined supporting and propelling member.

A still further object of the present invention is the provision in a vehicle of the character described of an improved and simple arrangement for connecting the rotatable combined supporting and propelling members to a frame so that the latter will be supported.

Other objects and advantages will be apparent from the following description, considered in conjunction with the accompanying drawings, in which Figure 1 is a side elevation of a vehicle embodying the present invention, Figure 2 is a section along the line 2—2 of Figure 1, Figure 3 is a transverse vertical section through one of the supporting and propelling members of the vehicle exhibited in the preceding views, Figure 4 is a longitudinal vertical section through the supporting and propelling member shown in Fig. 3, Figure 5 is a transverse vertical section through the other supporting and propelling member of the vehicle shown in Figures 1 and 2, Figure 6 is a longitudinal vertical section through the supporting and propelling member as shown in Figure 5, Figure 7 is a fragmentary perspective view showing the central portion of a head or end of any one of the supporting and propelling members together with a journal element and means for attaching the journal element to said one head or end, and Figures 8 and 9 are fragmentary sectional views of end portions of modified forms of supporting and propelling drums embodying the invention.

A vehicle embodying the invention includes a frame which may comprise a pair of parallel side members 1 connected to one another at their ends and held in spaced parallel relation by a pair of transverse end members 2. The frame is supported in horizontal position on combined supporting and propelling members, any desirable number of which may be employed. In the present embodiment of the invention, the frame is supported on two combined supporting and propelling members respectively designated generally 3 and 4.

The construction of the member 3 is the same as that of the member 4 except in details which will be particularly pointed out during the course of the following description. Each of the propelling and supporting members comprises a body 5 which is circular in cross sectional contour on any plane extending transversely therethrough intermediate of its ends and preferably is formed of a light gauge suitable metal, such as galvanized iron. But the drum may be made of wood or other material. Each body 5 preferably is provided with corrugations 6 extending circumferentially thereof. These corrugations may be of any desirable depth and the respective corrugations of one body 5 may be of different depths if desired.

Each body 5 has imperforate walls and is provided at opposite ends with inwardly extending flanges or lugs as indicated at 7 as best seen in Figures 3 to 6 inclusive for attachment through the agency of screws or bolts 8 to circular heads 9 which close the body 5 at opposite ends of the latter, whereby an air tight chamber will be provided within the body 5.

Each head 9 may be made of wood and may comprise one or more superposed layers, each of which may consist of a plurality of planks connected together in any suitable known manner. The heads 9 are secured to the particular body 5 with which they are associated in axial alignment with the latter and are of circular configuration and of larger diameter than the body, the marginal edge portions of the heads which are attached to each body 5 extending radially outward at 10 beyond the outer periphery of the body for a purpose to be presently described. Each body 5 and the heads 9 secured thereto at the opposite ends of the body comprise what may be termed a drum.

Each of the drums just described is provided at its opposite ends with a pair of oppositely extending stub axles or trunnions 11, each of which extends laterally from the center of an attaching member 12 which may be in the form of a spider wheel as best seen in Figure 7, the attaching member being secured as at 13 by bolts and nuts, screws or like fastening devices to a particular head 9 centrally of the latter.

The respective side members 1 of the frame are provided adjacent to the end of the frame which will be hereinafter termed the front end thereof with aligned bearings 14 in which the trunnions 11 extending from the opposite ends of the body of the supporting and propelling member 3 are journaled. The respective side members 1 of the frame also are provided adjacent to the opposite or rearward end of the frame with aligned bearings 15 in which the trunnions which extend from the ends of the body of the supporting and propelling member 4 are journaled. The supporting and propelling members 3 and 4 thus will be disposed in tandem formation with the axes thereof parallel and with the propelling members 3 directly in front of the member 4.

The body of the supporting and propelling member 4 is provided on its periphery with a circumferentially extending series of spaced apart paddle members or vanes 16, each of which extends longitudinally of the body of the supporting and propelling member 4 in radial edgewise position, the radial width of each member 16 being not greater and preferably approximately the same as the extent of projection of the marginal portions 10 of the heads of the body of the propelling and supporting member 4 beyond the peripheral surface of said body. The member 16 may be secured to the body of the propelling and supporting member 4 and to the marginal edge portion of the head thereof or to either the body or the marginal edge portions of the heads in any suitable known manner, no means therefor being shown in the drawings. The paddles probably should not be wide enough to extend to the edge of the outer or wooden head, in order that the outer or wooden head, or head of any other material, shall bear the weight on land and not the paddles or propellers.

The body of the supporting and propelling member 3 is provided on each periphery with a circumferentially extending series of spaced apart paddle members or vanes 17. Each of the members 17 has a radial width substantially the same as the extent of radial projection of the marginal edge portions of the heads of the member 3 beyond the peripheral wall of the body of the member 3. Each member 17 does not extend in a straight line between the projecting marginal edge portions of the heads on the body with which it is associated but is substantially V-shaped or right angular in longitudinal sectional contour and is disposed on the body of the member 3 so that the apex thereof will be positioned on the periphery of the body of the member 3 in advance of the end of the arms of the member 17 when the supporting and propelling member 3 is rotated in a clockwise direction. It also will be observed that the arms or convergent portions of each member 17 are twisted slightly from their ends toward their juncture with one another or in other words are formed with a slight pitch, as best seen in Figure 2. The members 17 may be secured to the body of the supporting and propelling member 3 and to the marginal edge portions of the head of the member 3 or to the body or the marginal portions of the head in any suitable known manner, no means therefor being shown.

It will be manifest that when the members 3 and 4 are disposed in the water, the members 3 and 4 being buoyant will support the platform above the surface of the water and that the platform will be propelled in a straight forward direction when the members 3 and 4 or either of these members is rotated in a clockwise direction, the paddle members on either or both of the supporting and propelling members engaging with the water to cause forward movement of the device. Any suitable known mechanism may be employed to drive the members 3 and 4 either separately or simultaneously. I do not wish to be restricted to the use of any particular driving mechanism but for the purpose of illustrating the operation of the device have shown in Figures 1 and 2 a driving mechanism which may include a motor 18, such as an internal combustion engine, mounted upon a platform 19 which is supported upon the side members 1 between the supporting and propelling members 3 and 4. The motor 18 has a drive shaft 20 on which a sleeve 21 may be loosely mounted, a clutch 22 which may be of any suitable known type of construction being provided for connecting the sleeve 21 with the drive shaft 20 and for disconnecting the sleeve 21 from the drive shaft 20 as desired. A sprocket secured to the sleeve may be connected by means of a chain 23 with a sprocket on one of the trunnions 11 for the supporting and propelling member 4. In a like manner, a chain 24 may connect a second sprocket on the sleeve 21 with a sprocket secured on one of the trunnions 11 for the supporting and propelling member 3. The clutch 22 may be shifted to and from position to connect the sleeve 21 with the drive shaft 20 by means of a clutch shifting lever 25 which is fulcrumed at 26 on a superstructure 27 which may be supported upon the frame of the device by means of uprights 28.

Attention is directed particularly to the shape of the vanes 17 and the arrangement thereof on the body of the member 3. When the members 3 and 4 are rotated in the water in a clockwise direction, the water striking the forward faces of the converging portions or arms of the respective vanes 17 will be deflected outward beyond the ends of the member 4 and will not impinge against the latter so as to hinder the operation thereof as might occur were straight vanes similar to those indicated at 16 secured upon the periphery of the supporting and propelling member 3.

When the device moves upon the land, the radially projecting marginal edge portions of the head of the supporting and propelling members function in the manner of rims or tread portions of wheels and movably support the frame and the superstructure of the device. The device therefore is capable of moving from the water up the sloping banks or shore of a stream and as far as necessary onto the land to permit loading or unloading thereof or for any other purpose.

In Figure 8, I show a modified form of drum which may be employed in forming a supporting and propelling member for the device. The modified form of drum has a body 30 made of light gauge metal and having circumferentially extending corrugations. The body 30 is provided at its ends with an outwardly turned flange as indicated at 31 against which the marginal edge portion of a flat circular head 32 abuts flatly, the diameter of the head 32 and of the flange 31 being the same and the head and the flange being secured together by suitable fastening means such as the rivets indicated at 33. With the construction just described, the flange 31 and the marginal edge portion of the head 32 will conjointly form one of the tread portions of the drum, a similar tread portion of course being located at the opposite end of the body 30.

The modified form of drum exhibited in Fig. 9 has a body 40 provided at its ends with flanges as indicated at 41 which extend obliquely to the axial line of the body. The body 40 is closed at each of its opposite ends by heads which comprise a central portion 42 and a marginal edge portion or flange 43 which lies flat wise against the flange 41 and is secured to the latter by rivets 44 or like fastening devices. The marginal edge portions 43 and the flange 41 are equal in width and together form tread portions of the drum. The central portion 42 of the drum head is shown as being substantially conical and as extending outwardly in a plane of the juncture of the flange 41 and the body 40. This central portion may have any desirable shape and configuration in cross sectional contour. The paddle blades of any one of the possible forms of the device which may embody the invention may be formed with convex, concave, otherwise curved or straight faces, may be soldered, clamped, screwed or otherwise secured to the supporting drum so as to have a water tight fit with the drum, may be made of wood, iron, or any other suitable material, and may be used on drums with, or without the extra, large heads.

While I speak chiefly of a boat built on or using only two drums or two supporting and propelling members, I will build some boats on three drums arranged in a triangle so as to avoid the current that necessarily comes from a revolving drum that has paddles or propellers on it, and I will build some on more than three drums.

Obviously, my invention is susceptible of embodiment in forms other than those illustrated in the accompanying drawings and I therefore consider as my own all such modifications and adaptations of the form of the device herein described as fairly fall within the scope of the appended claims.

I claim:

1. In a vehicle of the character described, a pair of supporting and propelling members, each comprising a rotatable hollow drum, said drums being disposed one in advance of the other with the axes of rotation thereof parallel, each of said drums having a circumferentially extending series of spaced apart paddle blades on the periphery thereof, the blades on the front drum having portions thereof extending obliquely to the direction of length of the drum on which they are supported and converging in the direction of rotation of the drum along a line extending circumferentially of the drum intermediate its length, and the blades on the rear drum extending longitudinally of the drum on which they are supported.

2. In a supporting and propelling member for land and water vehicles, a drum comprising a hollow body of circular contour in cross section at any place along its length, heads secured to said body at opposite ends of the latter, said body being formed of a light gauge metal having corrugations extending circumferentially thereof.

3. In a supporting and propelling member for land and water vehicles, a drum comprising a hollow body of circular contour in cross section at any place along its length, heads secured to said body at opposite ends of the latter, each head having a marginal edge portion thereof extending outward beyond the outer face of the body and said body having a flange at the end thereof proximate to said head abutting flatwise against said projecting marginal edge portion of said head.

FRANK TAYLOR RAMSEY.